United States Patent [19]
Perlman et al.

[11] Patent Number: 5,805,818
[45] Date of Patent: Sep. 8, 1998

[54] SYSTEM FOR ACKNOWLEDGING AVAILABILITY OF NEIGHBOR NODE USING DATA PACKET CONTAINING DATA THAT IS ORDINARILY FOWARDED TO NEIGHBOR NODE

[75] Inventors: Radia J. Perlman, Acton, Mass.; Neal D. Castagnoli, Morgan Hill, Calif.

[73] Assignee: Novell, Inc., Orem, Utah

[21] Appl. No.: 712,476

[22] Filed: Sep. 11, 1996

[51] Int. Cl.$^6$ .................................................. G06F 15/173
[52] U.S. Cl. ......................................................... 395/200.54
[58] Field of Search ........................... 395/200.53, 200.54

[56] References Cited

U.S. PATENT DOCUMENTS

| | | | |
|---|---|---|---|
| 5,437,046 | 7/1995 | Bright et al. | 395/200.53 |
| 5,477,531 | 12/1995 | McKee et al. | 370/249 |
| 5,485,578 | 1/1996 | Sweazey | 395/200.54 |

OTHER PUBLICATIONS

Interconnections Bridges and Routers, Addison–Wesley Professional Computing Series, Radia Perlman, 1992, pp. 193–203.

Conta et al., *Internet Control Message Protocol (ICMPv6) for the Internet Protocol Version 6* (IPv6) Specification, Network Working Group, Request for Comments number 1885, Dec. 1995.

Deering, S. Editor, *ICMP Router Discovery Messages*, Network Working Group, Request for Comments number 1256, Sep. 1991.

UNIX System Manager's Manual, ping command, Mar. 15, 1991.

J. Postel, *Internet Control Message Protocol, DARPA Internet Program Protocol Specification*, Network Working Group, Request for Comments number 792, Sep. 1981.

*Primary Examiner*—Richard L. Ellis
*Attorney, Agent, or Firm*—Cesari and McKenna, LLP

[57] ABSTRACT

A novel acknowledgment mechanism efficiently requests affirmation from a neighboring node coupled to a communication link of a network that the neighbor is "alive" and connected to that link. The acknowledgment mechanism comprises control information generated by a source node and generally stored in a network layer header of a data packet transmitted to the neighbor. This next-hop acknowledgement (or lack thereof) from the neighbor provides a fast and efficient indication of (lost) system connection between adjacent nodes of a network.

15 Claims, 8 Drawing Sheets

SYSTEM FOR ACKNOWLEDGING AVAILABILITY OF NEIGHBOR NODE USING DATA PACKET CONTAINING DATA THAT IS ORDINARILY FOWARDED TO NEIGHBOR NODE

FIELD OF THE INVENTION

This invention relates generally to computer networks and, more particularly, to efficient detection of lost connectivity among communication devices of a computer network.

BACKGROUND OF THE INVENTION

A computer network is a geographically distributed collection of interconnected communication links for transporting data between nodes, such as computers. A plurality of computer networks may be further interconnected by intermediate nodes, or routers, to extend the effective "size" of the networks, smaller portions of which may be maintained as autonomous domains of nodes. These nodes typically communicate by exchanging discrete "packets" of data according to predefined protocols. In this context, a protocol consists of a set of rules defining how the nodes interact with each other.

The communication links forming the networks may be permanently installed to their interconnected nodes, as in the case of an Ethernet communications system, or they may be dial-up lines of a switched telephone network that remain ordinarily unconnected. An example of a network that utilizes dial-up lines is the Integrated Services Digital Network (ISDN).

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services. In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

FIG. 1 illustrates a schematic block diagram of prior art protocol stacks 125 and 175 used to transmit data between a source node 110 and a destination node 150, respectively, of a computer network 100. Each protocol stack is structured according to the OSI seven-layer model; accordingly, each stack comprises a collection of protocols, one per layer. As can be seen, the protocol stacks 125 and 175 are physically connected through a communications channel 180 at the physical layers 124 and 164. For ease of description, the protocol stack 125 will be described.

Broadly stated, the physical layer 124 transmits a raw data bit stream over a communication channel 180, while the data link layer 122 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 120 routes data packets from the source node to the destination node by selecting one of many alternative paths through the physical network. The transport layer 118 accepts the datastream from the session layer 116, apportions it into smaller units (if necessary), passes the smaller units to the network layer 120 and provides appropriate mechanisms to ensure that all the units arrive correctly at the destination.

The session layer 116 establishes data transfer "sessions" between software processes on the source and destination nodes, along with management of such sessions in an orderly fashion. That is, a session not only allows ordinary data transport between the nodes, but it also provides enhanced services in some applications. The presentation layer 114 performs frequently-requested functions relating to the presentation of transmitted data, including encoding of data into standard formats, while the application layer 112 contains a variety of protocols that are commonly needed by processes executing on the nodes.

Data transmission over the network 100 therefore consists of generating data in, e.g., a sending process 104 executing on the source node 110, passing that data to the application layer 112 and down through the layers of the protocol stack 125, where the data are sequentially formatted as a packet for delivery onto the channel 180 as bits. Those packet bits are then transmitted to the protocol stack 175 of the destination node 150, where they are passed up that stack to a receiving process 174. Data flow is schematically illustrated by solid arrows.

Although actual data transmission occurs vertically through the stacks, each layer is programmed as though such transmission were horizontal. That is, each layer in the source node 100 is programmed to transmit data to its corresponding layer in the destination node 150, as schematically shown by dotted arrows. To achieve this effect, each layer of the protocol stack 125 in the source node 110 typically adds information (in the form of a header field) to the data packet generated by the sending process as the packet descends the stack. At the destination node 150, the various headers are stripped off one-by-one as the packet propagates up the layers of stack 175 until it arrives at the receiving process.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient communication performance. For this case, a fully connectionless service is desirable where each transmitted packet carries the fill address of its destination through the network.

Network layer protocols are generally used to implement a connectionless network service, the latter of which primarily defines a packet format. When the network layer receives a packet from the transport layer for transmission over the network, it adds (to the packet) a header containing, inter alia, source and destination addresses. Examples of network layer protocols are the connectionless network layer protocol (CLNP) defined by ISO, the Internet (IP) network layer protocol and the Internet Packet Exchange (IPX) protocol.

The overall packet formats of the CLNP and IP headers may be extended to accommodate added features by way of option fields contained within the headers defined by the network layer services. The types of options supported by these fields typically include source routing, priority and security-specific information. However, the conventional IPX header format is generally not expandable since its header was not designed to accomodate appended fields in a manner that is compatible with the remaining fields of the packet.

One aspect of network layer protocols involves the routing of packets from the source node to the destination node. In particular, this aspect of the network layer concerns the algorithms and protocols used by routers when cooperating to calculate paths through a network topology. A further aspect of these routing protocols pertains to handshaking exchanges between adjacent, neighboring routers coupled to a communication link for the purpose of determining whether that link is down. Such handshaking exchanges, e.g., control "hello" messages, require constant background traffic over the network to ensure that the neighbors are reachable; often, this traffic is expensive in terms of bandwidth and resource processing consumption.

In general, if there is a portion of the network that is only reachable by a node through a particular communication link, then that node typically would not need to know the availability of a neighbor coupled to that link unless the node has data to forward to the neighbor. Alternatively, if the node has recently received data from the neighbor, the node may assume that the neighbor is "up" and available. In either case, there is no reason to send the hello messages, thereby avoiding the overhead traffic needed to reassure the node that the link is connected.

However, in certain situations it still may be useful to determine if the link can bear traffic prior to sending data over that link. For these situations, the node periodically transmits the hello messages to the neighbor to solicit acknowledgement of the neighbor's availability on the network. Here, a hello message is sent and, if there is no response within a predetermined period of time, e.g., 20 seconds, then other messages are periodically sent to the neighbor. Upon receiving an acknowledgement responsive to the hello message, the node transmits a separate packet containing data to the neighbor. A problem with exchanging traffic involving distinct control messages and data packets is that the traffic consumes resources on the network; the present invention is directed to reducing such resource consumption.

SUMMARY OF THE INVENTION

The invention comprises an acknowledgment mechanism for quickly and efficiently requesting affirmation from a neighboring node coupled to a communication link of a network that the neighbor is "alive" and connected to that link. The novel mechanism preferably comprises control information within a packet that requests acknowledgement from the neighbor that the packet was successfully received. As described herein, this next-hop acknowledgement (or lack thereof) from the neighbor provides an efficient indication of (lost) system connection between adjacent nodes of a network.

Preferably, the control information is generated by a source node and generally stored in a network layer header of a data packet as an option. In the case of network layer headers that support option fields, such as the connectionless network layer protocol (CLNP) and the Internet (IP) network layer protocol headers, a new option type is defined for the next-hop acknowledgment. The Internet Packet Exchange (IPX) protocol header, however, does not accomodate option fields and, thus, a network addressing arrangement is provided that expands the format of this header to support the novel control information, e.g., a flag, as an option.

In accordance with the present invention, the inventive acknowledgement mechanism effectively combines the functions previously provided by two distinct message and packet transfers into a single packet transfer over the network to significantly reduce resource consumption on the network. Moreover, the next-hop acknowledgment mechanism may be used in a multiple-step process to provide a fast indication of lost system connection between adjacent nodes of a network.

For example, assume the acknowledgement flag is asserted within a packet that includes data transmitted by a source node over an optimal route encompassing a communication link to a neighbor node. As noted, the inventive mechanism operates to minimize the traffic needed to ensure that the neighbor is reachable by including the acknowledgement flag within a packet that would ordinarily be sent to the neighbor. According to the invention, if the link is "up" the neighbor node preferably returns an acknowledgment to the source immediately upon reception of the packet.

However, if the link is not up, then the source is quickly notified of this condition because the neighbor will not respond immediately with the acknowledgement. This latter situation is advantageous where the communication link of the optimal route happens to be the only path between these nodes. If, there is an alternate path between the nodes and the source node does not receive an acknowledgment within a reasonable, predetermined period of time (which may include a few retransmission attempts), then the source declares the neighbor "dead", i.e., unavailable, and quickly retransmits the message over that alternate path.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 1:
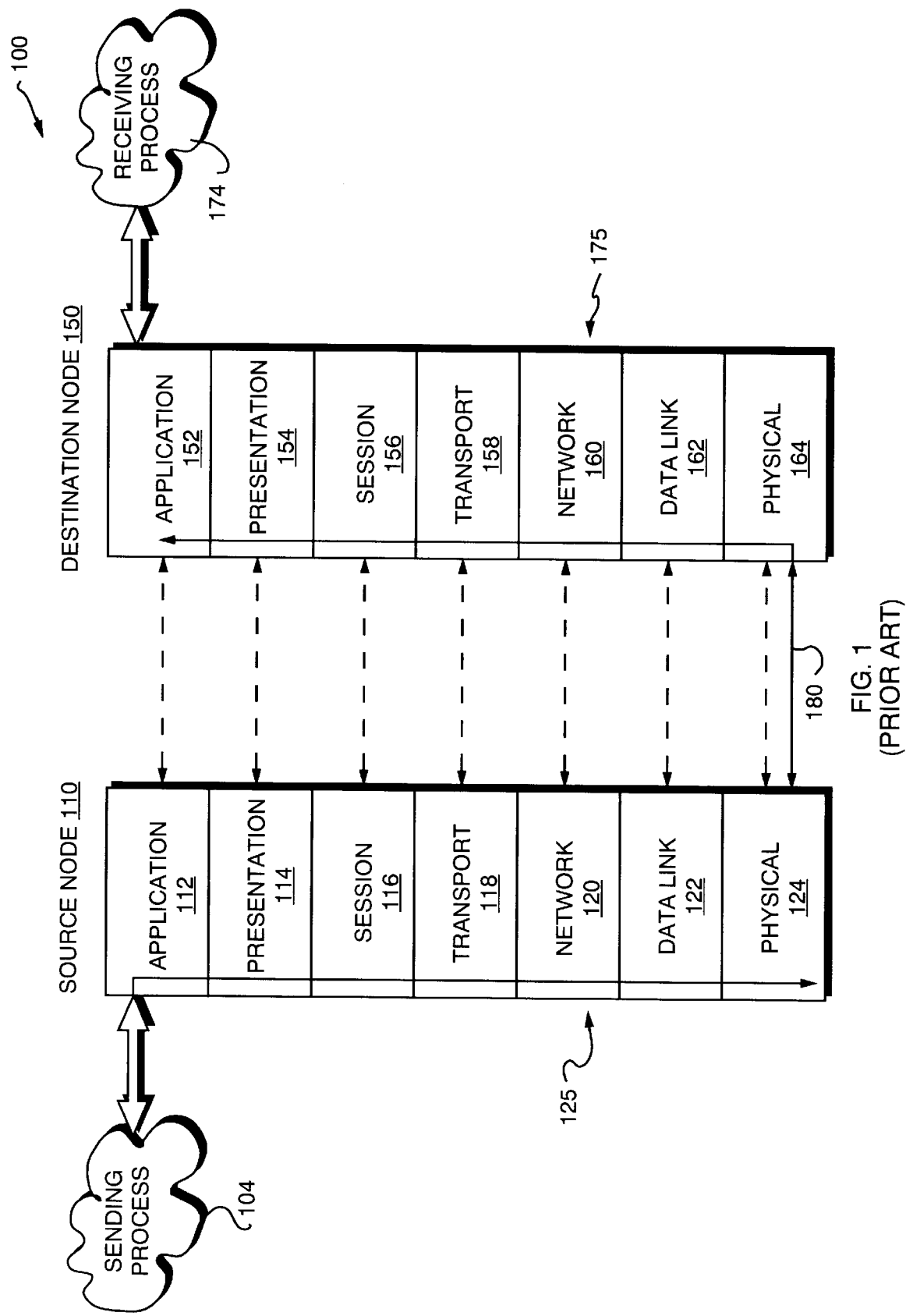
FIG. 1 is a schematic block diagram of prior art protocol stacks used to transmit data between a source node and a destination node of a computer network.
Figure 2:
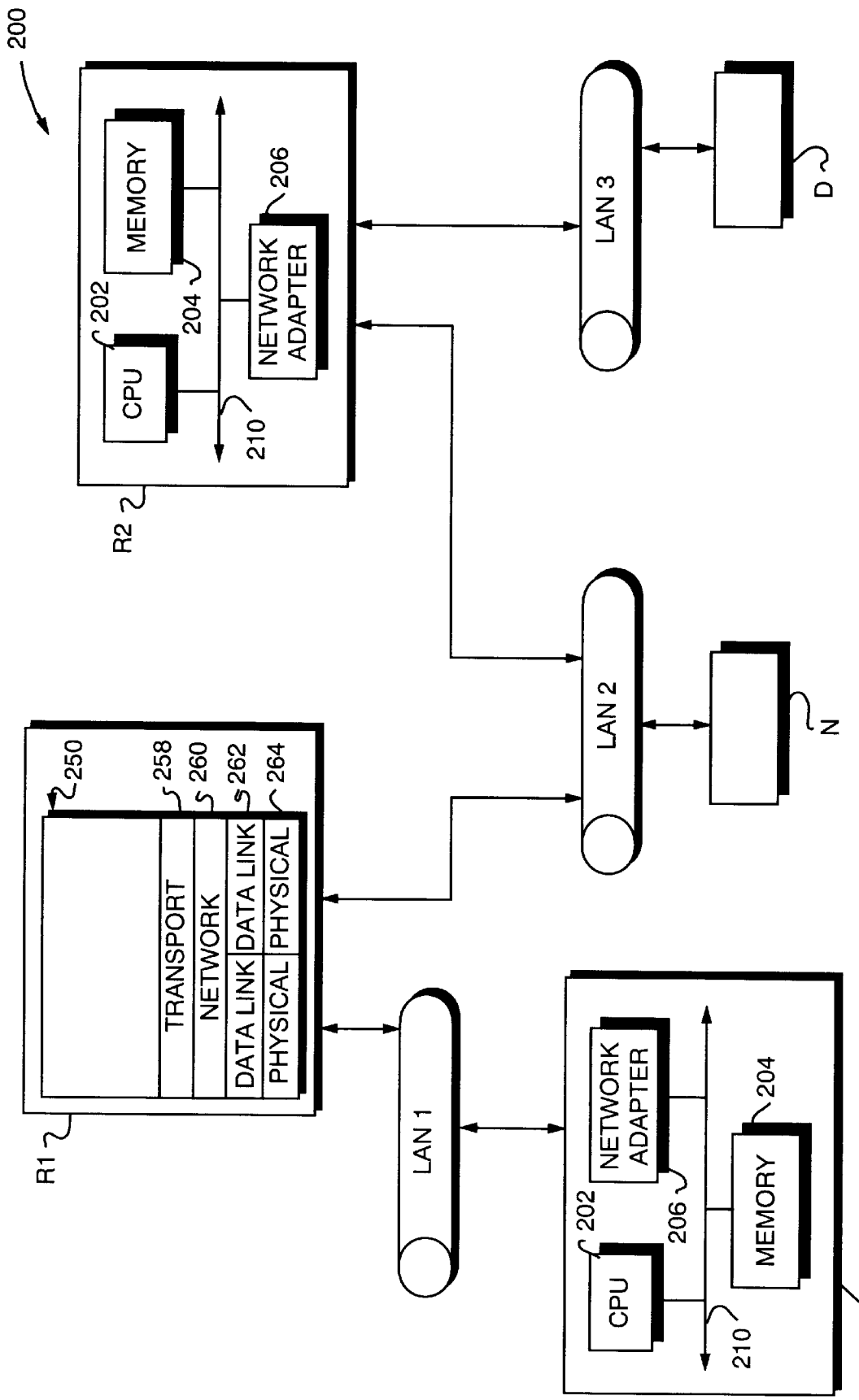
FIG. 2 is a block diagram of a network system including a collection of computer networks connected to a plurality of nodes.

FIG. 2 is a block diagram of a network system 200 comprising a collection of computer networks connected to a plurality of nodes. The nodes are typically general-purpose computers comprising a source node S, an end node N, a destination node D and a plurality of intermediate nodes R1–R2. Each node typically comprises a central processing unit (CPU) 202, a memory unit 204 and at least one network adapter 206 interconnected by a system bus 210. The memory unit 204 may comprise storage locations typically composed of random access memory (RAM) devices, which are addressable by the CPU 202 and network adapter 206. The memory unit typically provides temporary storage of information, such as executable processes and contents of data packets, as described further herein. An operating system, portions of which are typically resident in memory and executed by CPU, functionally organizes the node by, inter alia, invoking network operations in support of those processes executing in the CPU.

The computer networks included within system 200 may range from local area networks (LANs) to wide area networks (WANs). A LAN is a limited area network, while a WAN may be a public or private telecommunications facility that interconnects nodes widely dispersed using communication links. Communication among the nodes coupled to these networks is typically effected by exchanging discrete data "packets" specifying addresses of, e.g., source and destination nodes. Since the system shown in FIG. 2 comprises a relatively small group of interconnected LANs 1–3, it is preferably maintained as an autonomous domain. The intermediate nodes are preferably routers configured to facilitate the flow of data packets throughout the domain 200 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is preferably performed by network layer 260 of a protocol stack 250 within each node. Typically, the packet contains two destination addresses: the address of the final destination node and the address of the next node along the route. The final destination address remains constant as the packet traverses the networks along an optimal route, while the next destination address changes as the packet moves from node to node along the optimal route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 250, identifies the final destination of the packet as node D. Based on this information, R1 determines that the next node along the optimal path is router R2 and proceeds to pass the packet onto LAN 2 for reception by that node. Router R2 then determines that the next node is the final destination node D and transmits the packet over LAN 3 to node D.

Another aspect of the routing function relates to handshaking exchanges between adjacent, neighboring nodes, e.g., routers, coupled to the LAN for the purpose of determining whether a communication link of the LAN is down. Here, the routers periodically exchange hello messages to inform other routers of their availability on the network. If a neighboring router is unavailable, i.e., "down", it may take an unreasonably long period of time before the source router realizes this status. As noted, a problem with exchanging such traffic is that it consumes resources on the network.

Figure 3:
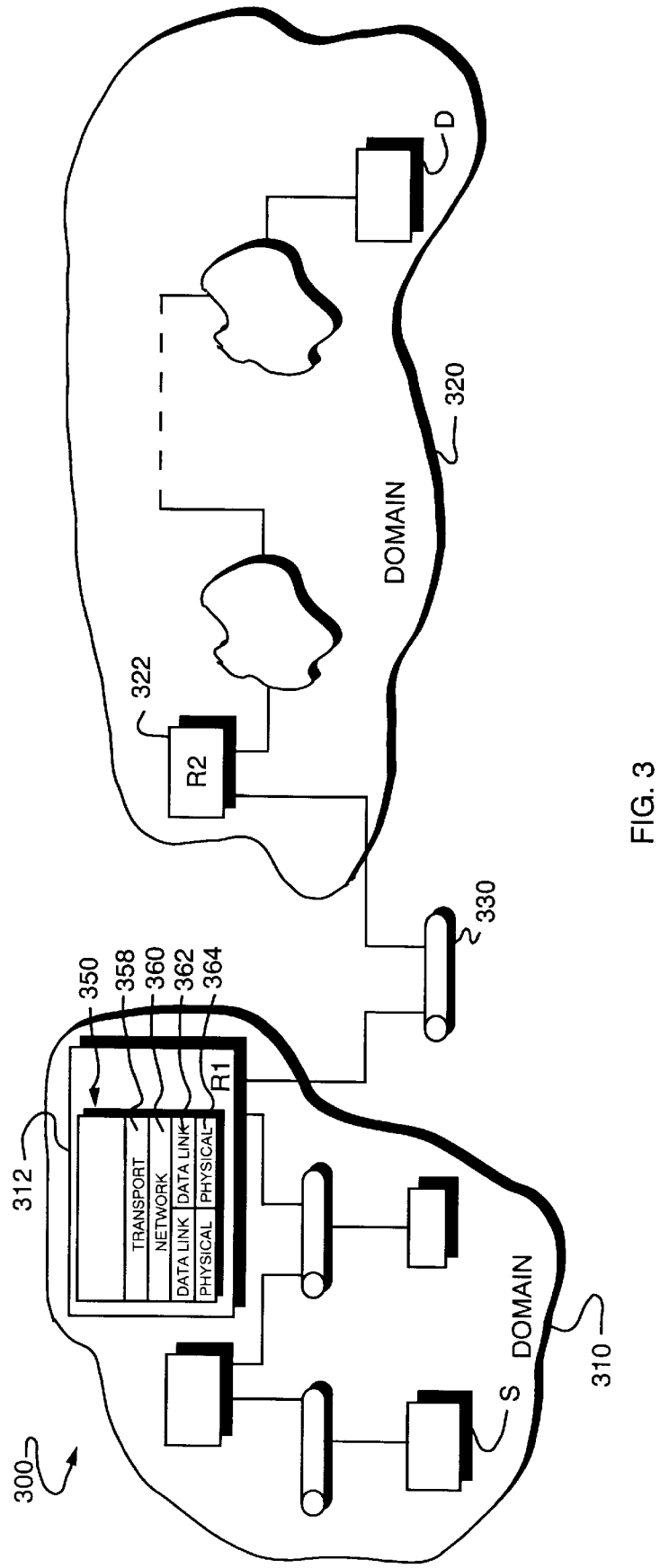
FIG. 3 is a schematic block diagram of a first embodiment of a system having a plurality of domains interconnected by a communication link in which a novel acknowledgment mechanism of the present invention may be advantageously used.

FIG. 3 is a schematic block diagram of a system 300 comprising a plurality of network portions or domains 310 and 320 interconnected by a LAN 330 coupled to routers R1 312 and R2 322. Here, a portion of the network is reachable by a router solely through a particular communication link. R1 and R2 typically "handshake" by constantly (e.g., every 20 seconds) exchanging hello messages; such handshaking is significant because if R2 were to be disconnected from the LAN 330 for any reason, R1 could alert nodes within domain 310 that nodes within domain 320 are unreachable. However, this type of handshaking exchange typically requires constant, and expensive, background traffic over the network to ensure that the neighboring routers, and their respective domains, are reachable.

For routers 312 and 322 to be used in system 300, the interconnected networks must be compatible at the network layer. The networks may, however, differ at the data link layer 362 and the physical layer 364, as shown schematically in the protocol stack 350 of router 312. Although the routers may operate with any network layer protocol, in the illustrative embodiment described herein, the network layer protocols are preferably the connectionless network layer protocol (CLNP), the Internet (IP) network layer protocol and the Internet Packet Exchange (IPX) protocol.

Figure 4A:
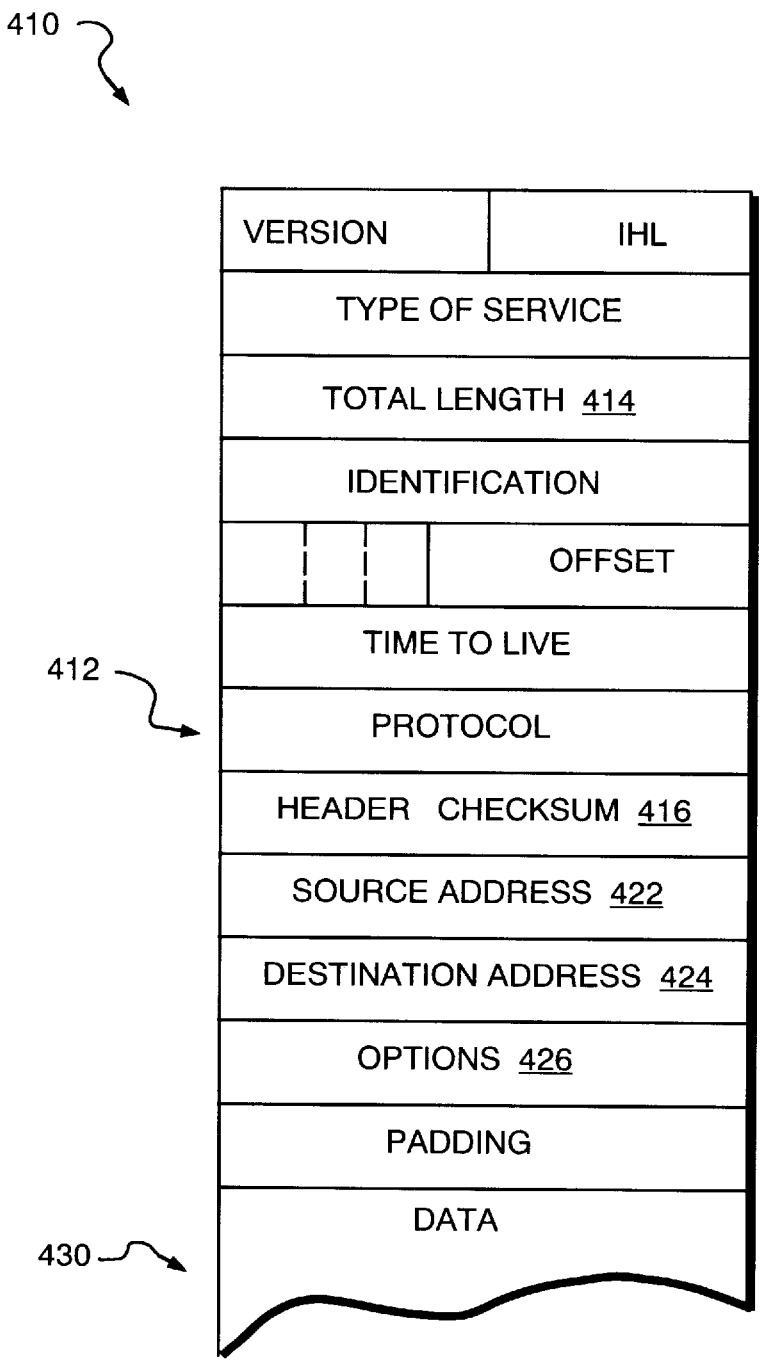
FIG. 4A is a schematic diagram depicting the format of a conventional IP network layer header.
Figure 4B:
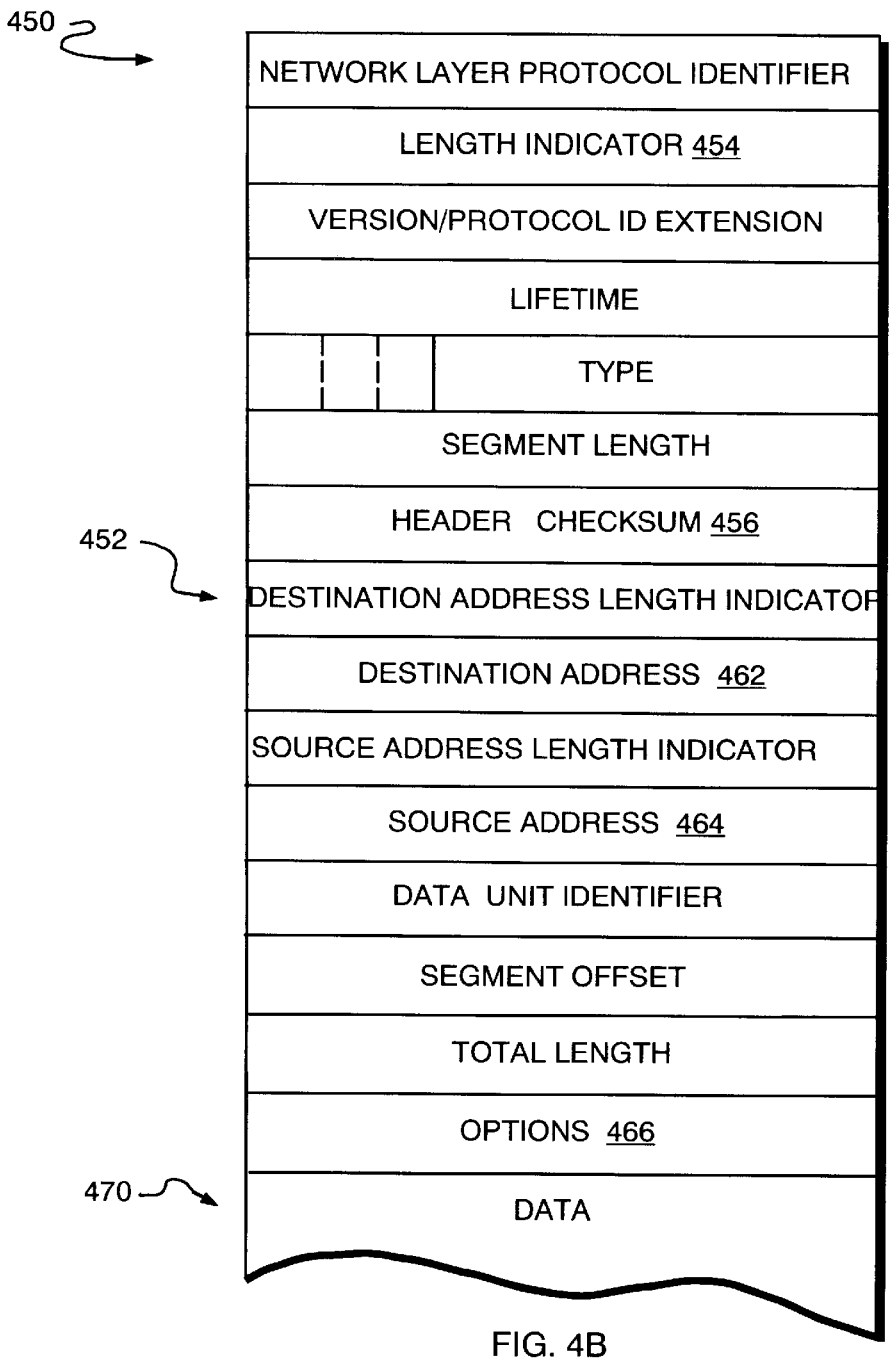
FIG. 4B is a schematic diagram depicting the format of a conventional CLNP network layer header.
Figure 4C:
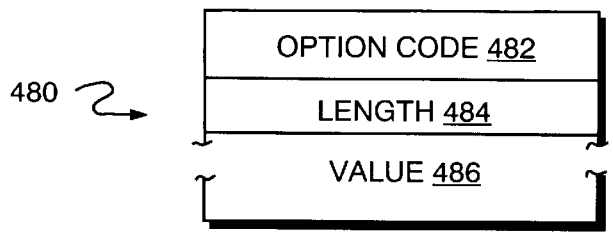
FIG. 4C is a schematic diagram depicting the format of an options field of the network layer headers of FIGS. 4A and 4B.

As further noted, when the network layer 360 receives a data packet from the transport layer 358 for transmission over the network, it adds a network layer header to the packet. The formats of these header fields are generally the same among all network layer services primarily because the same information are typically contained in each packet. FIGS. 4A and 4B depict the formats of IP and CLNP network layer packets 410 and 450, respectively. It can be seen that both of these packets generally contain information pertaining to their headers 412 and 452 (e.g., length and checksum fields); more particularly, though, each header includes an options field 426 and 466 to accommodate added features. The types of options supported by these fields typically include source routing, priority and security-specific information. FIG. 4C depicts the general format of the contents of an options field 480 which comprises an octet (1-byte) option code field 482 that uniquely defines a type of option, a 1-byte length field 484 indicating the length of the option in bytes, and a variable, e.g., 0–254 byte, value field 486.

Figure 5:
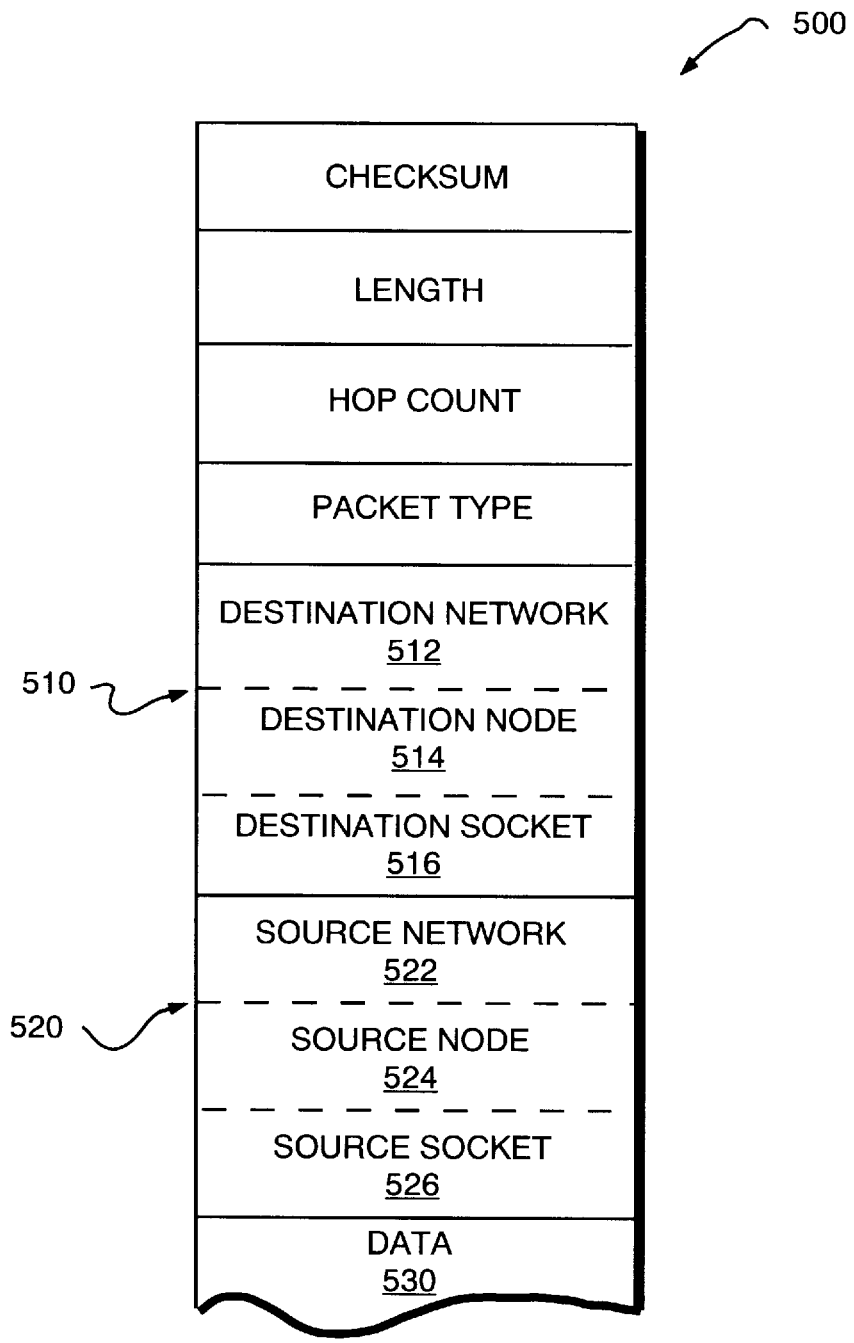
FIG. 5 is a schematic diagram depicting the format of a conventional IPX network layer header.

However, the IPX protocol header does not accomodate option fields and, thus, a network addressing arrangement is provided that expands the format of this header. FIG. 5 is a schematic diagram depicting the format of a conventional IPX packet 500 having a network layer header comprising approximately 30 bytes. Specifically, the header contains, inter alia, hierarchical destination and source addresses, each of which includes a plurality of address elements. For example, the destination address 510 comprises a 4-byte destination network field 512 that indicates the particular network over which the packet will travel, a 6-byte destination node field 514 identifying a data link layer address of the receiving node on that network and a 2-byte destination socket field 516 specifying the receiving process in the receiving node. Data field 530 is appended to the header, immediately following the source address field 520.

Figure 6:
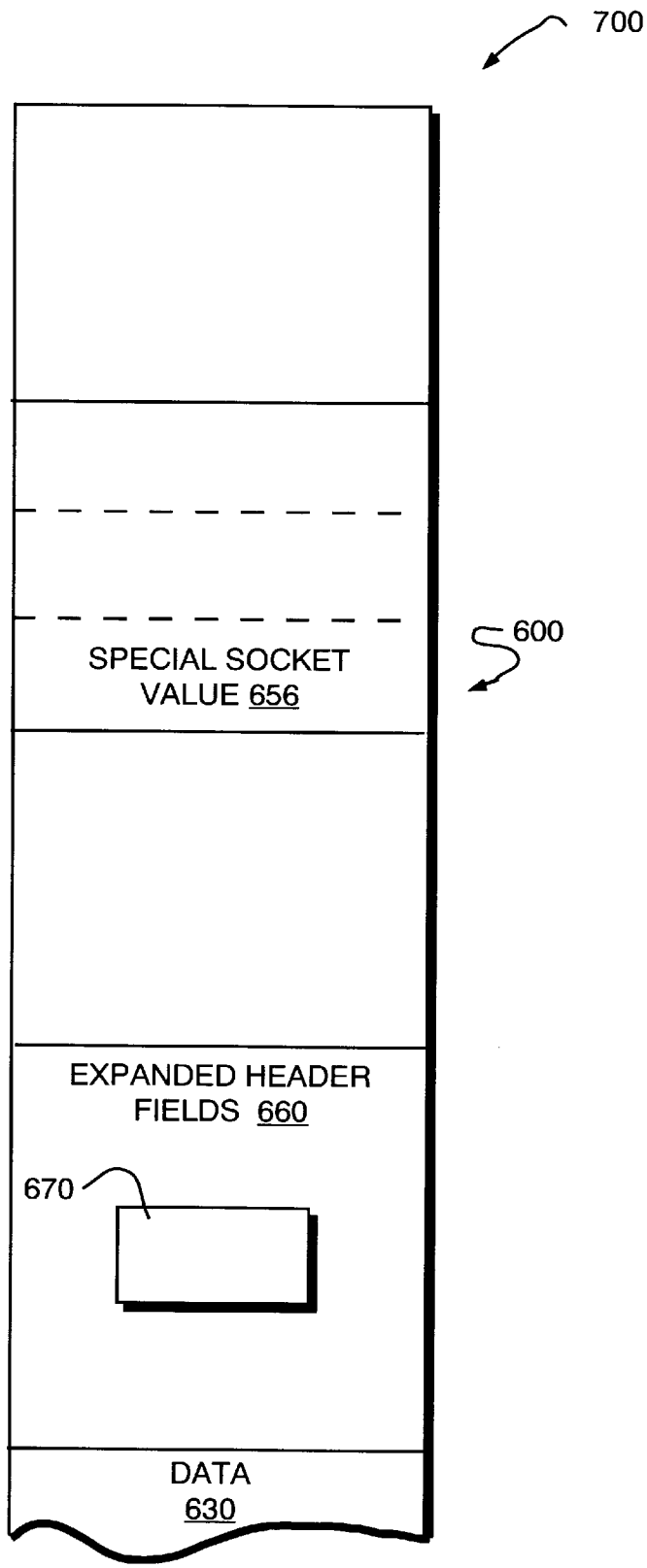
FIG. 6 is a schematic diagram illustrating an improved format of the IPX network layer header for storing the novel acknowledgment mechanism according to the invention.

According to the addressing arrangement, a special socket value is provided that indicates the provision of additional header information after the source address field to effectively create an improved network layer header. FIG. 6 is a schematic diagram illustrating the format of the improved IPX network layer header 600. A source node substitutes the special socket value 656 for the actual destination socket number within the 2-byte destination socket field 516 of the conventional destination address field 510. Preferably, the special socket value instructs the routers to examine the contents of expanded header fields 660 prior to forwarding packets over the networks.

Figure 7:
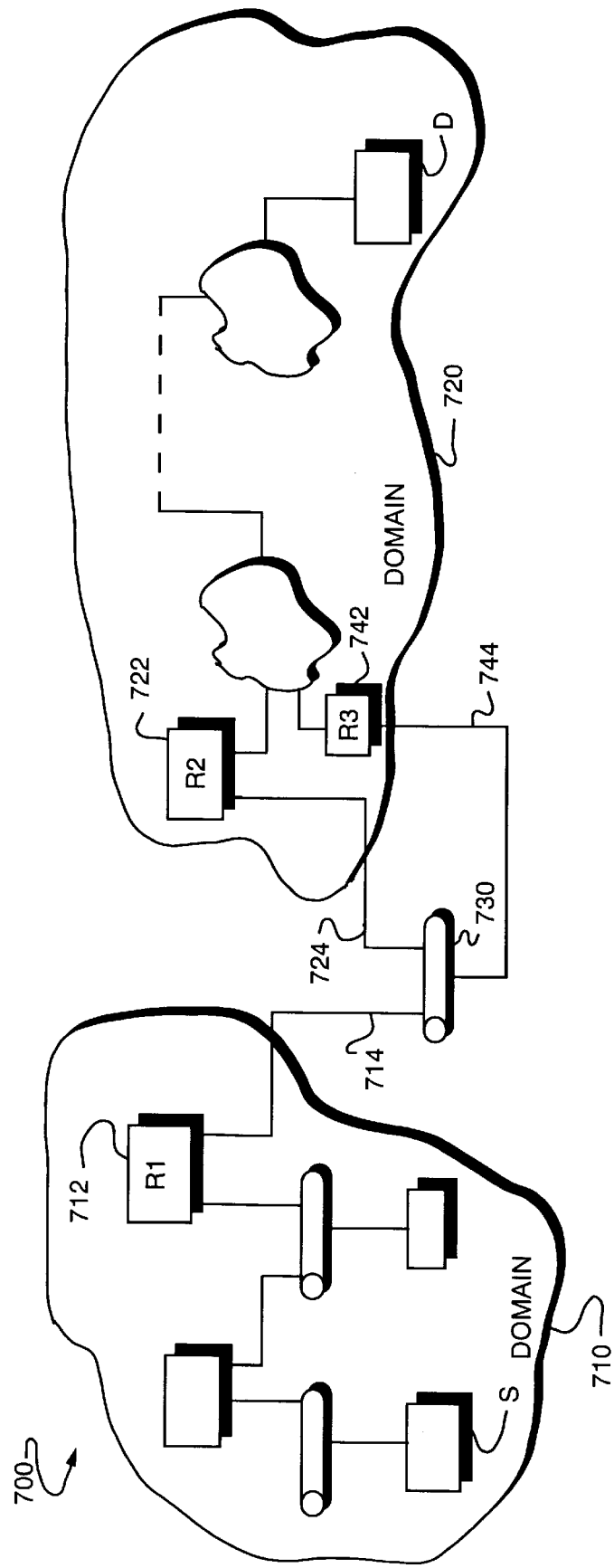
FIG. 7 is a schematic block diagram of a second embodiment of a system having a plurality of domains interconnected by communication links in which the novel acknowledgment mechanism of the present invention may be advantageously used.

Referring again to the network topology of FIG. 3, there is not an alternate route between the domains 310 and 320 of the system 300; accordingly, R1 typically does not need to know the availability of R2 unless R1 has data to forward to R2. However, FIG. 7 is a schematic block diagram of a system having alternate routes between domains. Specifically, system 700 comprises a plurality of network domains 710 and 720 interconnected by routers R1 712, R2 722 and R3 742 coupled to LAN 730. R1 further connects domain 710 to LAN 730 by way of communication link 714, while R2 and R3 couple domain 720 to LAN 730 via links 724 and 744, respectively. In addition, the path encompassing R1 and R2 has been determined the optimal route between domains 710 and 720, while the path comprising R1 and R3 is an alternate, "next best" route between those portions of the network.

In accordance with the invention, an acknowledgment mechanism is provided for quickly and efficiently requesting affirmation from a neighboring router coupled to a communication link of a network that the neighbor is "alive" and connected to that link. Referring now to FIGS. 1–7, the novel acknowledgment mechanism preferably comprises control information within a packet that requests acknowledgement from the neighbor that the packet was successfully received. As described herein, this next-hop acknowledgement (or lack thereof) from the neighbor provides an efficient indication of (lost) system connection between adjacent nodes of a network.

Preferably, the control information is generated by source node S and generally incorporated within the network layer header as an option. In the case of the IP and CLNP network layer protocols whose headers contain option fields, a new option type is defined for the next-hop acknowledgment. Specifically, the new option type comprises an option code, e.g., "NHA", stored in field 482 that uniquely specifies a next-hop acknowledgment.

With respect to the improved IPX header 600, on the other hand, the control information is stored in a field 670 of the expanded header fields 660. Although the contents of the field comprising the control information may vary, preferably the field is provided as a novel flag 670 and the state of this flag instructs the neighboring router to acknowledge receipt of the packet. In other words, when the router 712 receives a data packet having the special socket value, e.g., "SS", substituted for the actual destination socket number of the destination address, the router examines the contents of expanded header fields and, in particular, the state of the flag 670 prior to forwarding the packet over the link 730.

According to the present invention, the inventive acknowledgement mechanism eliminates the periodic traffic exchanges previously used to determine if a neighboring node is up by providing a single packet transfer over the network that quickly determines the availability of that neighbor. Moreover, the next-hop acknowledgment mechanism may be used in a multiple-step process to provide a fast indication of lost system connection between adjacent nodes of a network.

For example, assume the acknowledgement flag is asserted within a packet that includes data transmitted by source node S over an optimal route encompassing R1, R2 and their interconnecting communication links. As noted, the inventive mechanism operates to minimize the traffic needed to ensure that the neighbor, e.g., R2, is reachable by including the acknowledgement flag within a data packet that would ordinarily be sent to the neighbor. According to the invention, if the link is "up" the neighbor node preferably returns an acknowledgment to the source immediately upon reception of the packet.

However, if the link is not up, then the source is quickly notified of this condition because the neighbor will not respond immediately with the acknowledgement. This latter situation is advantageous where the communication links of the optimal route happen to comprise the only path between these nodes (see FIG. 3). If there is an alternate path between the nodes (FIG. 7) and the source node does not receive an acknowledgment within a reasonable, predetermined period of time from the destination node (which may include a few retransmission attempts), then the source declares the destination "dead", i.e., unavailable. The invention described herein quickly detects that the optimal path is unavailable and re-routes the message over the alternate path encompassing R1, R3 and their interconnecting links to maintain the system connection between the nodes.

An advantage of the next-hop acknowledgement mechanism is reduction of traffic over the network. In other words, the source node would ordinarily send the data packet to the neighboring node; according to the invention, the control acknowledgement flag is set within that packet to detect the availability of the neighbor. The inventive acknowledgement mechanism thus significantly reduces resource consumption on the network needed to provide a fast indication of lost system connection between adjacent nodes of a network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for quickly and efficiently requesting affirmation from a neighboring node coupled to a communication link of a network that the neighbor is available and connected to that link, the apparatus comprising:

a source node coupled to the communication link;

a data packet forwarded by the source node over a network path encompassing the neighboring node, the data packet containing data of a type that is ordinarily forwarded to the neighboring node in connection with data communication and distinguishable from a control message; and control information stored in the data packet, the control information instructing the neighboring node to acknowledge receipt of the data packet to thereby affirm availability of the neighboring node without use of the control message.

2. The apparatus of claim 1 wherein the control information is generated by the source node.

3. The apparatus of claim 1 wherein the control information is stored in a network layer header of the data packet.

4. The apparatus of claim 3 wherein the control information comprises an option within the network layer header.

5. The apparatus of claim 4 wherein the option is a new option type defined for acknowledgments by neighboring nodes and contained within an option field of the header.

6. The apparatus of claim 4 wherein the option is a flag stored within an expanded header field of the header.

7. The apparatus of claim 1 wherein the control information is contained within higher-layer protocol stack headers of the data packet other than a network layer header.

8. The apparatus of claim 1 wherein the control information instructs the neighboring node to acknowledge receipt of the data packet within a predetermined period of time.

9. The apparatus of claim 8 wherein the predetermined time is immediately upon its reception of the message.

10. The apparatus of claim 1 wherein the neighboring node is a router.

11. A method for quickly and efficiently requesting an acknowledgement from a neighboring router coupled to a communication link of a network that the neighbor is available and connected to that link, the method comprising the steps of:

generating control information at a sending node coupled to the link;

storing the control information within a data packet containing data of a type that is ordinarily sent to the neighbor in connection with data communication and distinguishable from a control message;

forwarding the data packet to a destination node over a network path encompassing the neighbor; and examining the control information at the neighbor, the control information instructing the neighbor to acknowledge receipt of the data packet to thereby confirm availability of the neighbor without use of the control message.

12. The method of claim 11 further comprising the step of, if the neighbor is alive and connected to the link, acknowledging receipt of the packet within a predetermined period of time.

13. The method of claim 12 wherein the predetermined time is immediately upon its reception of the message.

14. The method of claim 12 further comprising the steps of, if the neighbor does not acknowledge receipt of the packet within the predetermined period of time:

declaring the neighbor unavailable; and forwarding the packet over a next optimal network path.

15. The method of claim 11 wherein the sending node is a router.

* * * * *